(12) United States Patent
Nguyen (10) Patent No.: US 9,981,154 B2
(45) Date of Patent: May 29, 2018

(54) EXERCISE APPARATUS

(71) Applicant: Vu Nguyen, Calgary (CA)

(72) Inventor: Vu Nguyen, Calgary (CA)

( * ) Notice: Subject to any disclaimer, the term of this patent is extended or adjusted under 35 U.S.C. 154(b) by 0 days. days.

(21) Appl. No.: 15/177,531

(22) Filed: Jun. 9, 2016

(65) Prior Publication Data

US 2016/0361583 A1 Dec. 15, 2016

(30) Foreign Application Priority Data

Jun. 11, 2015 (CA) .................................... 2894328

(51) Int. Cl.
*A63B 21/04* (2006.01)
*A63B 17/04* (2006.01)
(Continued)

(52) U.S. Cl.
CPC .......... *A63B 21/0442* (2013.01); *A63B 17/04* (2013.01); *A63B 21/00061* (2013.01); *A63B 21/00181* (2013.01); *A63B 21/068* (2013.01); *A63B 21/16* (2013.01); *A63B 21/4043* (2015.10); *A63B 23/0405* (2013.01); *A63B 23/1209* (2013.01); *A63B 1/00* (2013.01); *A63B 21/0414* (2013.01); *A63B 21/0552* (2013.01); *A63B 21/4034* (2015.10); *A63B 21/4035* (2015.10); *A63B 23/0238* (2013.01); *A63B 23/03525* (2013.01); *A63B 23/03541* (2013.01); *A63B 23/03575* (2013.01);
(Continued)

(58) Field of Classification Search
CPC ............ A63B 21/0442; A63B 21/0414; A63B 21/00061; A63B 21/00181; A63B 21/0552; A63B 21/068; A63B 21/16; A63B 21/4043; A63B 21/4034; A63B 21/4035; A63B 1/00; A63B 17/04; A63B 23/0238; A63B 23/03541; A63B 23/03575; A63B 23/03525; A63B 23/0405; A63B 23/1209; A63B 23/1227; A63B 23/1236; A63B 2023/0411; A63B 2208/0214; A63B 2208/028; A63B 2208/0204

See application file for complete search history.

(56) References Cited

U.S. PATENT DOCUMENTS

3,948,513 A * 4/1976 Pfotenhauer ........... A63B 17/04
                                                              482/142
4,241,914 A   12/1980 Bushnell
(Continued)

*Primary Examiner* — Loan H Thanh
*Assistant Examiner* — Megan Anderson
(74) *Attorney, Agent, or Firm* — Davis & Bujold PLLC; Michael J. Bujold (57) ABSTRACT

An exercise apparatus has a base, a first vertical support and a second vertical support. The base has at least one horizontal support. The at least one horizontal support has a first end and a second end. First vertical support and second vertical support each have two vertical members spaced from each other and connected to a bottom support. The bottom support of the first vertical support is attached to the first end of the at least one horizontal support of the base and the bottom support of the second vertical support is attached to the second end of the at least one horizontal support of the base. The first vertical support and the second vertical support are opposite each other. At least one anchor is positioned on each of the vertical supports for removably connecting a resistance band to each of the vertical supports.

16 Claims, 10 Drawing Sheets

(51) Int. Cl.
  *A63B 21/068* (2006.01)
  *A63B 21/16* (2006.01)
  *A63B 23/04* (2006.01)
  *A63B 23/12* (2006.01)
  *A63B 21/00* (2006.01)
  *A63B 1/00* (2006.01)
  *A63B 21/055* (2006.01)
  *A63B 23/02* (2006.01)
  *A63B 23/035* (2006.01)
  *F16B 7/10* (2006.01)

(52) U.S. Cl.
  CPC ....... *A63B 23/1227* (2013.01); *A63B 23/1236* (2013.01); *A63B 2023/0411* (2013.01); *A63B 2208/0204* (2013.01); *A63B 2208/028* (2013.01); *A63B 2208/0214* (2013.01); *A63B 2225/09* (2013.01); *A63B 2225/093* (2013.01); *F16B 7/105* (2013.01)

(56) References Cited

U.S. PATENT DOCUMENTS

| | | | |
|---|---|---|---|
| 5,306,220 A * | 4/1994 | Kearney | A63B 23/00 482/104 |
| 5,346,448 A * | 9/1994 | Sollo | A63B 21/00181 482/104 |
| 7,217,227 B2 | 5/2007 | Finn | |
| 7,318,793 B2 | 1/2008 | Dubrul et al. | |
| 7,896,786 B1 | 3/2011 | Osbourne | |
| 7,909,743 B1 * | 3/2011 | Webber | A63B 21/078 482/104 |
| 8,808,151 B1 * | 8/2014 | Whaley | A63B 21/0442 482/129 |
| 9,072,940 B1 * | 7/2015 | Gutierrez | A63B 21/1627 |
| 9,289,638 B2 * | 3/2016 | Towley, III | A63B 21/00047 |
| 2007/0203002 A1 * | 8/2007 | Webber | A63B 21/078 482/104 |
| 2011/0009250 A1 | 1/2011 | Barringer | |
| 2011/0275499 A1 | 11/2011 | Eschenbach | |
| 2012/0065025 A1 * | 3/2012 | Kopp | A63B 1/00 482/25 |
| 2013/0123081 A1 | 5/2013 | Boland | |

* cited by examiner

EXERCISE APPARATUS

FIELD OF THE DISCLOSURE

The present application relates generally to an exercise apparatus for assisting and resisting the user in performing exercises.

BACKGROUND

This section provides background information to facilitate a better understanding of the various aspects of the invention. It should be understood that the statements in this section of this document are to be read in this light, and not as admissions of prior art.

Many people are too intimated or too embarrassed to go to the gym. People such as this are much more comfortable working out in the comforts of their own homes. Treadmills, ellipticals and other types of home gym equipment are often expensive and cumbersome which can further deter people from making a commitment to working out. Simple exercises such as body weight push-ups and body weight squats are good exercises for people to develop the fundamentals and build the foundation to begin weight lifting. However, many people are unable to complete these simple exercises without modifying the movement or sacrificing technique or form.

BRIEF SUMMARY

There is provided an exercise apparatus that has a base, a first vertical support and a second vertical support. The base has at least one horizontal support with a first end and a second end. Each of the first vertical support and the second vertical support have two vertical members spaced from each other and connected to a bottom support. The bottom support of the first vertical support is attached to the first end of the horizontal support of the base and the bottom support of the second vertical support is attached to the second end of the horizontal support of the base. The first vertical support and the second vertical support are orientated such that they are opposite each other. At least one anchor is provided on each of the vertical supports for removably connecting a resistance band(s) to the vertical supports.

In one embodiment, the vertical members of the first vertical support and the second vertical support may be positioned such that they are equidistant from a centerline of the base. The center line is positioned between the vertical members of each of the first vertical support and the second vertical support.

In one embodiment, the vertical members may have a first portion and a second portion. The first portion of the vertical members is movably engaged in the second portion and is lockable for telescopically adjusting the height of the vertical members and the at least one anchor. The second portion is connected to the bottom support.

In one embodiment, each of the bottom supports may also be telescopically adjustable. Each bottom support has a first portion and a second portion with the first portion being movably engaged in the second portion and lockable for telescopically adjusting the distance between the vertical members.

In one embodiment, each of the vertical supports may also include a removable bar on a top of the vertical members parallel to the bottom support. The removable bar may be made of a first portion and a second portion with the first portion being movably engaged in the second portion and lockable for telescopically adjusting the length of the removable bar.

In one embodiment, the base consists of two horizontal supports that are positioned in parallel spaced relation to each other. While it is preferable for the horizontal supports to be attached to the first end and the second end of the bottom supports, the horizontal support members may be attached anywhere along the length of the bottom supports.

In one embodiment, the exercise apparatus has a removable assisting seat. The removable assisting seat is used to assist the user with various exercises such as push-ups and squats. The removable assisting seat is held parallel to the base and supported between the vertical supports by the resistance bands that are removably connected to each of the vertical members and the removable assisting seat.

In one embodiment, a bench may be removably attached to the base. The bench may be used to assist with exercises such as chest flies.

In one embodiment, a standing platform may be removably attached to the base. Standing platform is used to hold down the exercise apparatus during upward movements when the base is narrow enough that standing on the base is not practical.

There is also provided an exercise apparatus that has a base, a first vertical support and a second vertical support. The base has two horizontal supports that are positioned in parallel spaced relation to each other. Each of the horizontal supports has a first end and a second end. The first and second vertical supports each have two vertical members spaced from each other and connected to a bottom support. The bottom support has a first end and a second end. The first end of the bottom support is attached to the first end of the horizontal supports and the second end of the bottom support is attached to the second end of the horizontal supports. The first vertical support and the second vertical support are positioned opposite each other. The bottom supports are telescopically adjustable for adjusting the distance between the vertical members. At least one anchor is provided on each of the vertical members for removably connecting a resistance band. Each of the vertical members has a first portion and a second portion. The first portion has the at least one anchor and is movably engaged in the second portion. The second portion is attached to the bottom support. The first portion is lockable within the second portion for telescopically adjusting the height of the vertical members and the at least one anchor.

In one embodiment, each of the bottom supports is telescopically adjustable. Bottom supports may have a first portion and a second portion with the first portion being movably engaged in the second portion and lockable for telescopically adjusting the distance between the vertical members.

In one embodiment, bottom supports may have a first portion, a second portion and a third portion. The second portion and the third portion are movably engaged in the first portion and lockable for telescopically adjusting the distance between the vertical members. The vertical members are connected to the second portion and the third portion.

In one embodiment, the vertical members of the first vertical support and the second vertical support may be positioned such that they are equidistant from a centerline of the base. The center line is positioned between the vertical members of each of the first vertical support and the second vertical support.

In one embodiment, each of the vertical supports may also include a removable bar on a top of the vertical members parallel to the bottom support. The removable bar may be made of a first portion and a second portion with the first portion being movably engaged in the second portion and lockable for telescopically adjusting the length of the removable bar.

In one embodiment, the exercise apparatus has a removable assisting seat. The removable assisting seat is used to assist the user with various exercises such as push-ups and squats. The removable assisting seat is held parallel to the base and supported between the vertical supports by the resistance bands that are removably connected to each of the vertical members and the removable assisting seat.

In one embodiment, a bench may be removably attached to the base. The bench may be used to assist with exercises such as chest flies.

In one embodiment, a standing platform may be removably attached to the base. Standing platform is used to hold down the exercise apparatus during upward movements when the base is narrow enough that standing on the base is not practical.

BRIEF DESCRIPTION OF THE DRAWINGS

These and other features will become more apparent from the following description in which references are made to the following drawings, in which numerical references denote like parts. The drawings are for the purpose of illustration only and are not intended to in any way limit the scope of the invention to the particular embodiments shown.

DETAILED DESCRIPTION OF THE PREFERRED EMBODIMENTS

An exercise apparatus, generally identified by reference numeral 10, will now be described with reference to FIG. 1 through FIG. 11 and FIG. 16 through FIG. 17. A variation of the exercise apparatus, generally identified by reference numeral 200, will be described with reference to FIG. 12 through 15.

Figure 1:
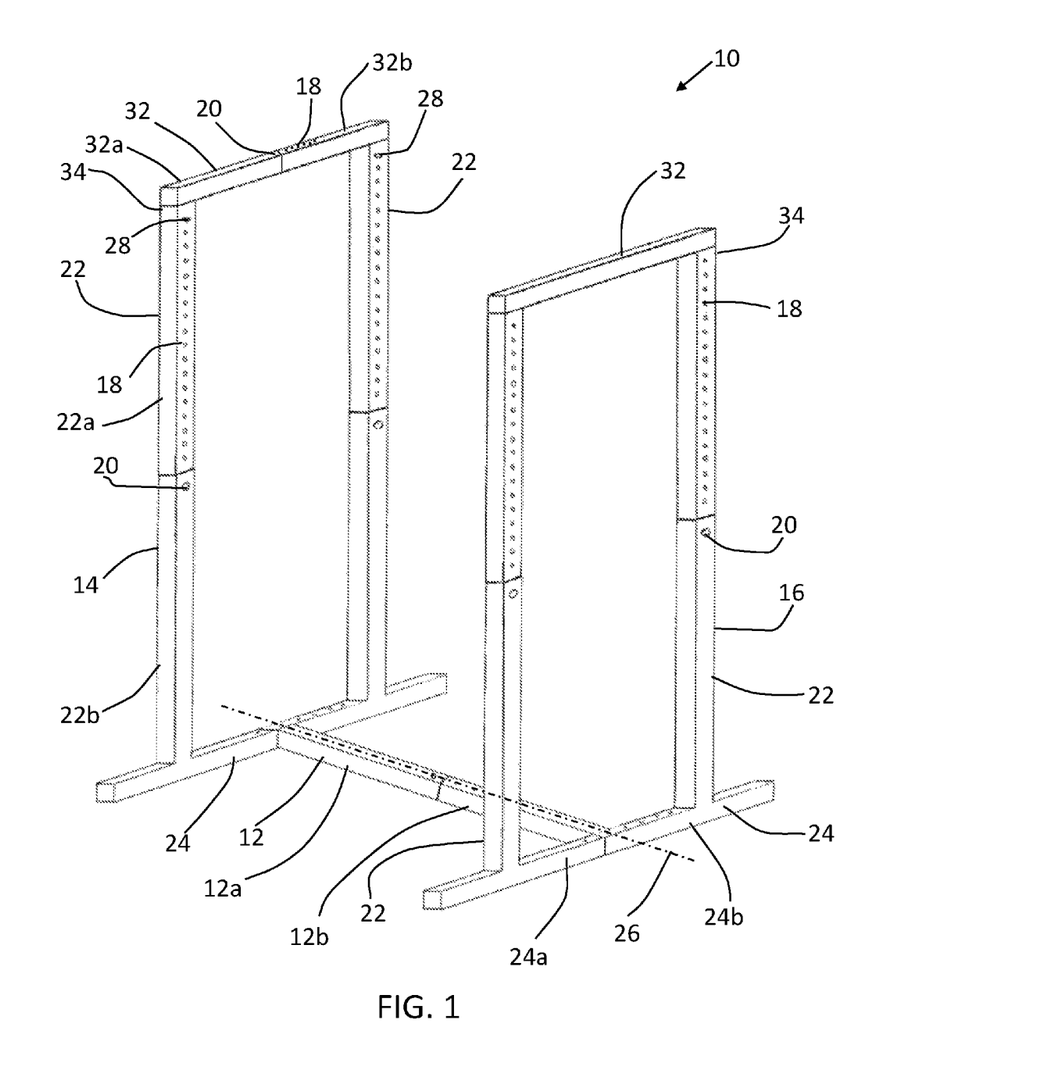
FIG. 1 is a perspective view of the frame of the exercise apparatus.
Figure 2:
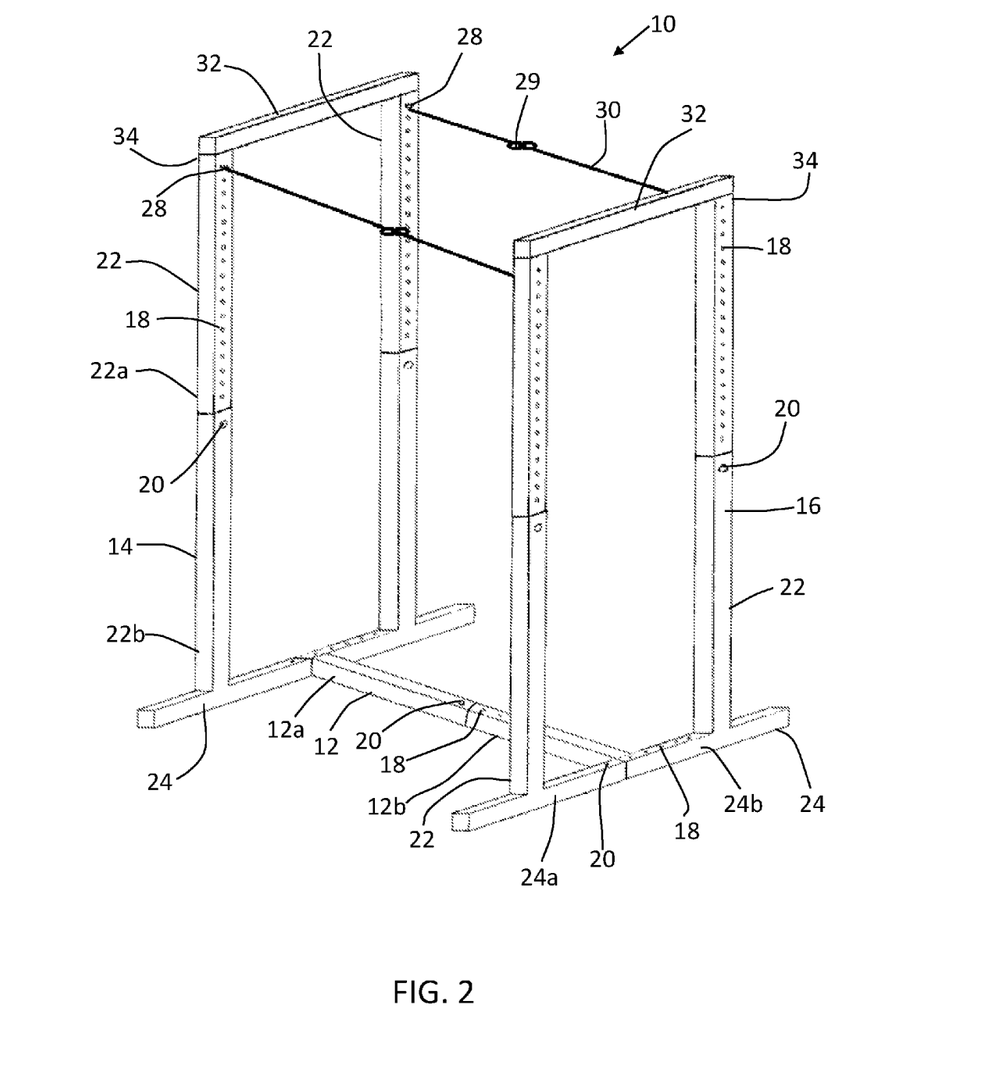
FIG. 2 is a perspective view of the exercise apparatus with resistance bands attached in a first orientation.
Figure 7:
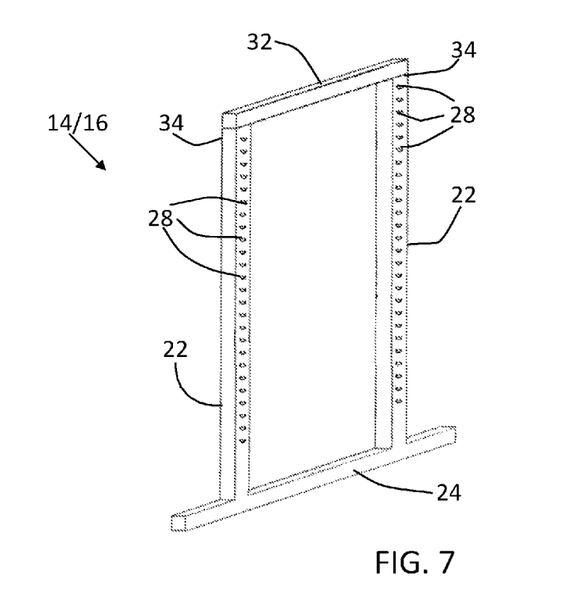
FIG. 7 is a perspective view of a vertical support with a plurality of anchors.

Referring to FIG. 1, an exercise apparatus 10 has a base 12, a first vertical support 14 and a second vertical support 16. Base 12 has a first portion 12a and a second portion 12b with first portion 12a being movably engaged in second portion 12b and lockable for telescopically adjusting the width of base 12. Referring to FIG. 2, in the embodiment shown, first portion 12a of base 12 and second portion 12b of base 12 have a plurality of corresponding apertures 18 through which a locking pin 20 locks first portion 12a in relation to second portion 12b. A person of skill will understand that first portion 12a of base 12 and second portion 12b of base 12 may be locked together using locking screw, cable ties or any other method known by a person skilled in the art. First vertical support 14 and second vertical support 16 each have two vertical members 22 spaced from each other and are connected to a bottom support 24. Bottom support 24 of first vertical support 14 is attached to first portion 12a of base 12 and bottom support 24 of second vertical support 16 is attached to second portion 12b of base 12. First vertical support 14 and second vertical support 16 are positioned opposite each other. Referring to FIG. 1, in the embodiment shown, each vertical member 22 is equidistant from a center line 26 of base 12. Centre line 26 is found between vertical members 22 of each of first vertical support 14 and second vertical support 16. A person of skill will understand that different positioning of vertical members 22 may be used, however the first and second vertical supports 14 and 16 should remain opposite each other. Referring to FIG. 2, an anchor 28 is positioned on each of vertical members 22 for removably connecting resistance bands 30 to each of vertical members 22. Referring to FIG. 7, a plurality of anchors 28 may be positioned at spaced intervals along vertical members 22. A person of skill will understand that a resistance band is any type of band that may be stretched and return to its unstretched state. Referring to FIG. 2, resistance bands 30 must also be strong enough to support the weight exerted on it by a user of exercise apparatus 10, in the embodiment shown, each vertical member 22 has a resistance band 30 attached to anchor 28 by clips 29. A person of skill will understand that resistance bands 30 could be tied to anchor 28 or could be attached in any other way that allows for easy removal of resistance bands 30 from vertical members 22.

Figure 6:
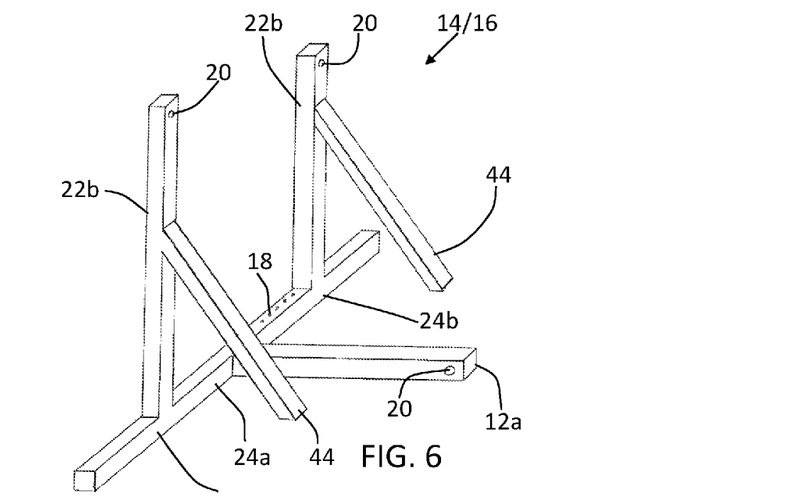
FIG. 6 is a perspective view of an additional support member usable with the exercise apparatus.

Referring to FIG. 6, additional support for exercise apparatus 10 may be created by incorporating legs 44 onto first vertical support 14 and second vertical support 16. Legs 44 provide additional support to prevent first vertical support 14 and second vertical support 16 from falling inwards during use.

Figure 3:
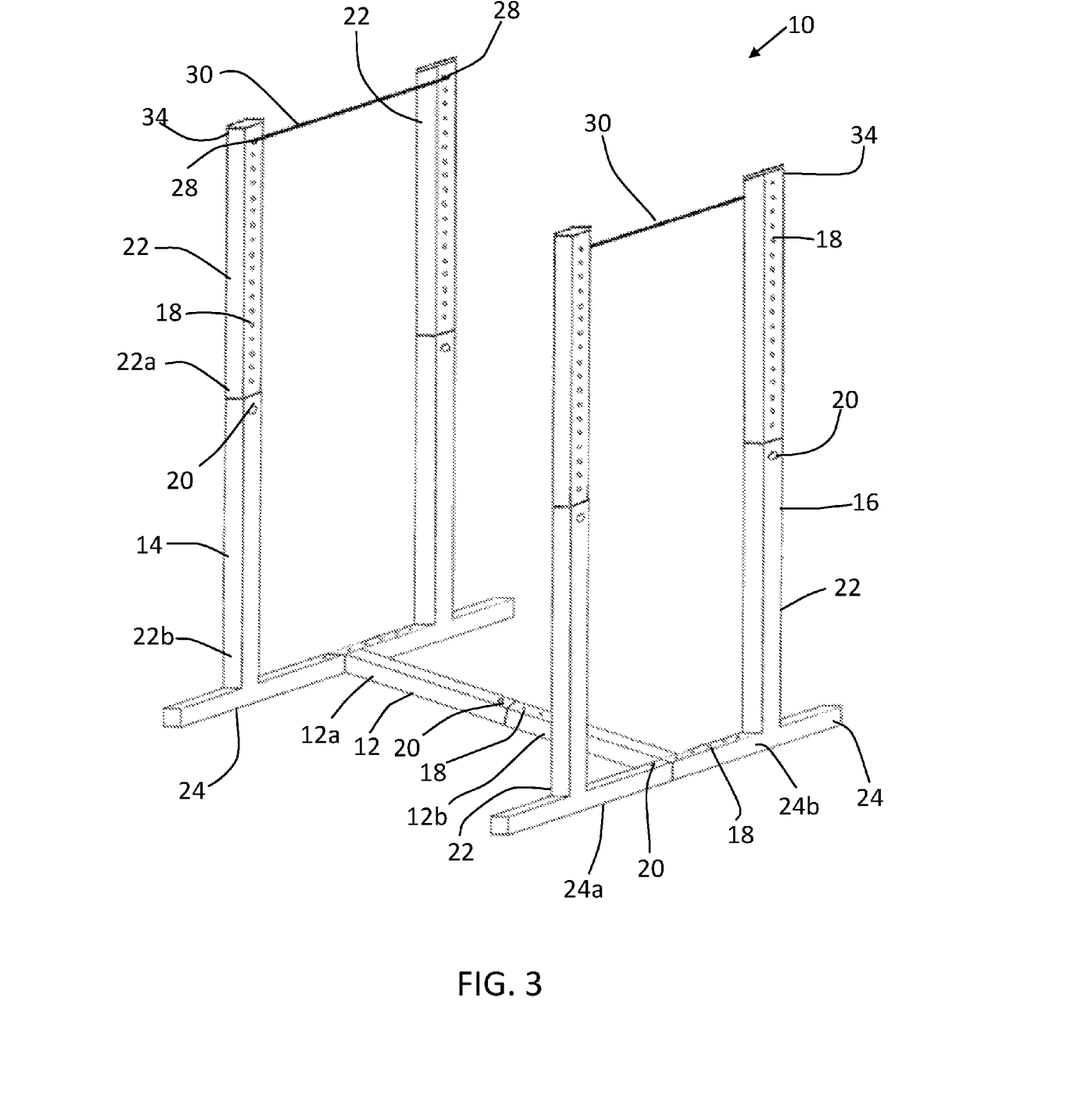
FIG. 3 is a perspective view of the exercise apparatus with resistance bands attached in a second orientation.

Referring to FIG. 2 and FIG. 3, exercise apparatus 10 is preferably adjustable in three dimensions to allow for use by different individuals, for different exercises and to limit the overall size of exercise apparatus 10 for easier storage. Exercise apparatus 10 is adjustable to accommodate different sized torsos, arm lengths and body widths. It is preferable that base 12, all vertical members 22 and both bottom supports 24 be telescopically adjustable to allow for easy adjustment of exercise apparatus 10. Each of vertical members 22 has a first portion 22a and a second portion 22b with the first portion 223 being movably engaged in the second portion 22b and lockable for telescopically adjusting the height of vertical members 22 and anchor 28 height. In the embodiment shown, first portion 22a of vertical member 22 and second portion 22b of vertical member 22 have a plurality of corresponding apertures 18 through which a locking pin 20 locks first portion 22a in relation to second portion 22b. A person of skill will understand that first portion 22a of vertical member 22 and second portion 22b of vertical member 22 may be locked together using locking screw, cable ties or any other method known by a person skilled in the art. Each of bottom supports 24 has a first portion 24a and a second portion 24b with the first portion 24a being movably engaged in second portion 24b and lockable for telescopically adjusting the distance between vertical members 22. In the embodiment shown, first portion 24a of bottom support 24 and second portion 24b of bottom support 24 have a plurality of corresponding apertures 18 through which a locking pin 20 locks first portion 24a in relation to second portion 24b. A person of skill will understand that first portion 24a of bottom support 24 and second portion 24b of bottom support 24 may be locked together using locking screw, cable ties or any other method known by a person skilled in the art. Base 12 may be any size, however to limit the overall size of exercise apparatus 10 bottom 24 support of first vertical support 14 and second vertical support 16 are longer than base 12 is wide. The telescopic nature of base 12, vertical members 22 and bottom supports 24 allow exercise apparatus 10 to be taken apart for storage or allows for exercise apparatus 10 to be made more compact for storage.

Figure 9:
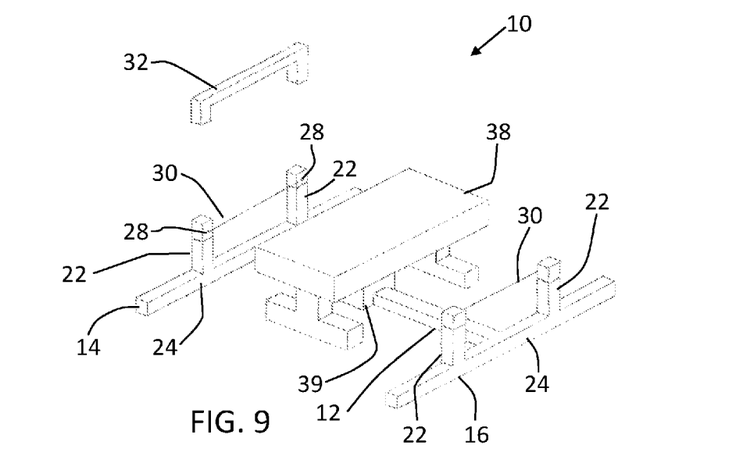
FIG. 9 is a perspective view of a bench used in association with the exercise apparatus.

Referring to FIG. 9, when using exercise apparatus 10 for exercises such as dips or for assisting with squats, a removable bar 32 may be attached on a top 34 of vertical members 22 parallel to bottom support 24. While not shown, hand grips may be added to removable bar 32 to provide additional gripping and comfort for the user. Referring to FIG. 1, when bottom supports 24 are telescopically adjustable, it is preferred that removable bar 32 also be telescopic and have a first portion 32a and a second portion 32b with the first portion 32a being movably engaged in second portion 32b and lockable for telescopically adjusting the length of removable bar 32. Referring to FIG. 9, removable bar 32 can be removed from top 34 of vertical members 22 to allow for exercises such as chest flies to be performed. When removable bars 32 are not attached to vertical members 22, resistance exercises such as tricep extensions and curls can be performed.

Figure 4:
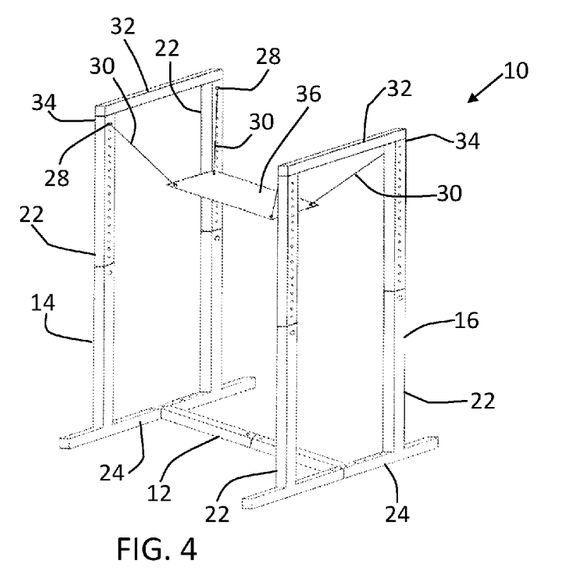
FIG. 4 is a perspective view of the exercise apparatus with a removable assisting seat attached.
Figure 5:
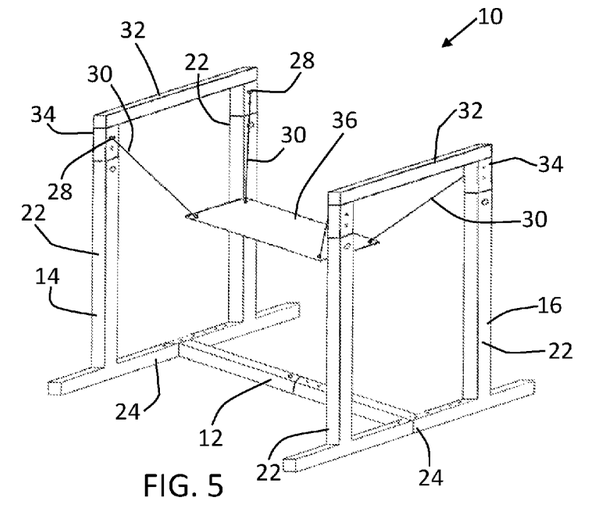
FIG. 5 is a perspective view of the exercise apparatus with the removable assisting seat attached and adjusted into a lower orientation.
Figure 16:
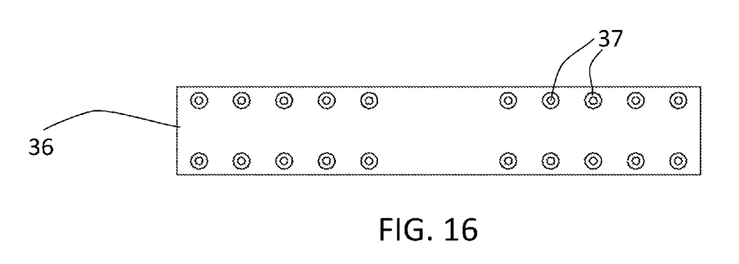
FIG. 16 is a top plan view of a removable assisting seat.
Figure 17:
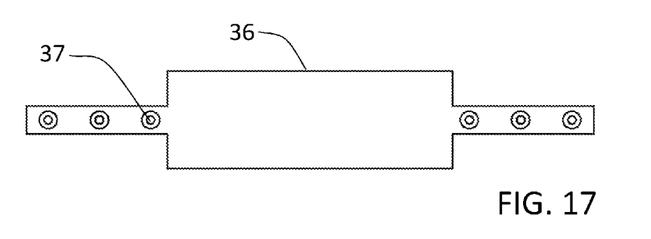
FIG. 17 is a top plan view of an alternative embodiment of a removable assisting seat.

Referring to FIG. 4 and FIG. 5, a removable assisting seat 36 may be held parallel to base 12 and is supported between vertical supports 14 and 16 by resistance bands 30 that are removably connected to each of vertical members 22 and removable assisting seat 36. Removable assisting seat 36 may be made of many different materials including leather which is moldable to the users body, nylon or plastic. Removable assisting seat 36 may be used to assist in performing push-ups and squats. Referring to FIG. 16 and FIG. 17, different shapes for assisting seat 36 allow for users to choose an assisting seat 36 that is comfortable to them. In the embodiment shown, grommets 37 are provided for attaching resistance bands 30. A person of skill will understand that different methods of attaching resistance bands 30 may be used. Removable assisting seat 36 provides support to the upper/mid torso to assist the user in performing push-ups, the buttocks to assist the user in performing squats and the knees to assist the user in performing dips. When dips are being performed, removable bar 32 on top 34 of vertical members 22 are required.

Referring to FIG. 9, a bench 38 may be removably attached to base 12 to allow for more comfortable use of exercise apparatus 10 when user is lying on their back. This is beneficial when exercises such as chest flies are performed. Bench 38 has a third leg 39 to pin down base 12. When a chest fly is being performed, removable bars 32 may be unattached from top 34 of vertical members 22 to allow for a full range of motion of the user. Back flies, chest presses and rows may also be performed with bench 38.

Figure 8:
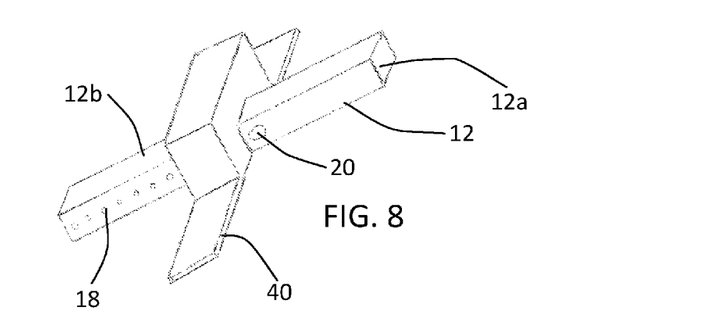
FIG. 8 is a perspective view of a standing platform for use in association with the exercise apparatus.

Referring to FIG. 8, a standing platform 40 may be removably attached to base 12 to allow for upwards resistive exercises to be performed.

Figure 10:
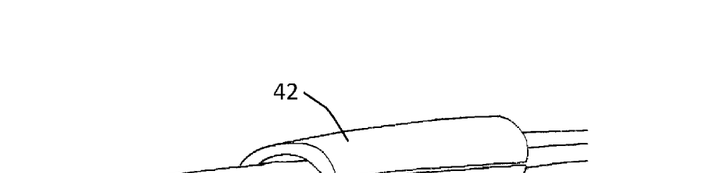
FIG. 10 is a perspective view of a grip usable on the resistance bands of the exercise apparatus.

Referring to FIG. 10, the amount of resistance or assistance provided by exercise apparatus 10 is determined by the type and quantity of resistance band(s) 30 that are used. The amount of assistance provided by resistance bands 30 is based on the resistance of resistance bands 30. Resistance is increased with thickness and the thickness of resistance bands 30 to be used may be based on user preference. Extra support may also be provided by attaching more than one resistance band 30 to each vertical member. Grips 42 may be placed around resistance bands 30 to provide a more comfortable grip to the user. Depending upon the type of exercise being performed, one end of resistance band 30 may be attached to apparatus 10, while the second end of resistance band 30 has a handle or strap for use on the users arm, leg, hand or foot.

Figure 11:
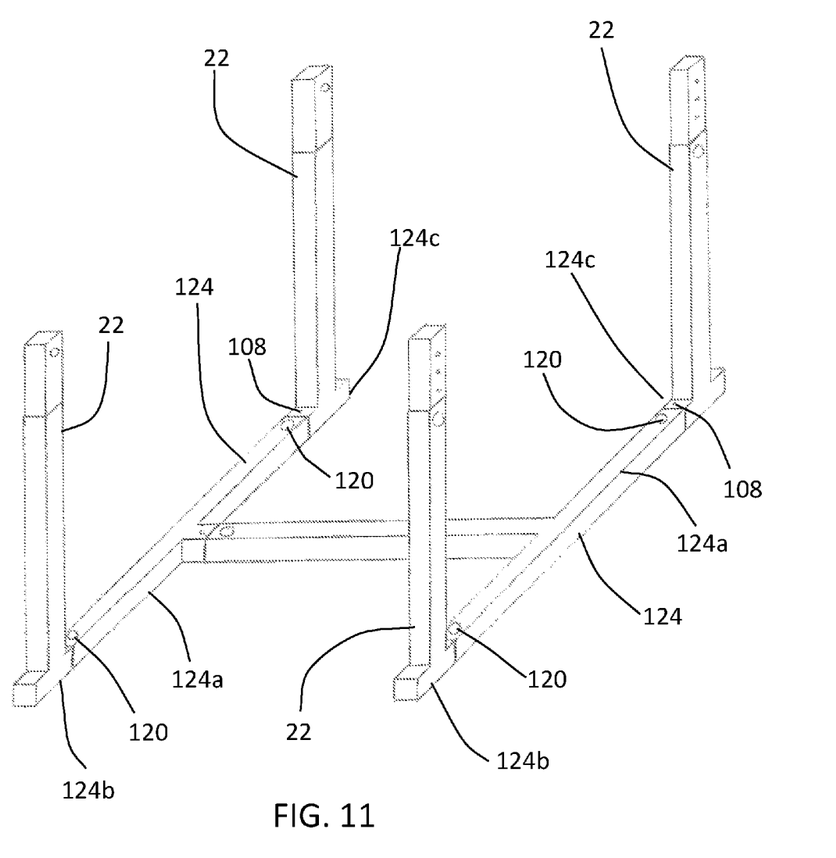
FIG. 11 is a perspective view of a variation of the frame of the exercise apparatus.

Referring to FIG. 11, a variation of the frame for exercise apparatus 10 is shown. Bottom support 124 may be made up of a first portion 124a, a second portion 124b and a third portion 124c. Second portion 124b and third portion 124c are movably engaged in first portion 124a and are lockable for telescopically adjusting the distance between vertical members 22. Vertical members 22 are connected to second portion 124b and third portion 124c. This variation of the frame may provide additional stability as second portion 124b and third portion 124c are movable independent of each other. In the embodiment shown, first portion 124a, second portion 124b and third portion 124c have a plurality of corresponding apertures 108 through which a locking pin 120 locks second portion 124b and third portion 124c in relation to first portion 124a. A person of skill will understand that first portion 124a and second portion 124b and first portion 124a and third portion 124c may be locked together using locking screws, cable ties or any other method known by a person skilled in the art.

While exercise apparatus 10 may be made of any material suitably designed for carrying the weight of individuals using the apparatus 10, it is preferred that exercise apparatus 10 be made of a strong but light weight metal such as steel or aluminum. This provides appropriate strength while maintaining a lightweight exercise apparatus that is not cumbersome for individuals to move.

An advantage of exercise apparatus 10 is that it is an all-in-one at home gym that is relatively uncomplicated. There are no pulleys or stacked weights required for use of exercise apparatus 10. In addition, exercise apparatus 10 is light-weight and has no moving parts. Assistance and resistance is provided by resistance bands.

Figure 12:
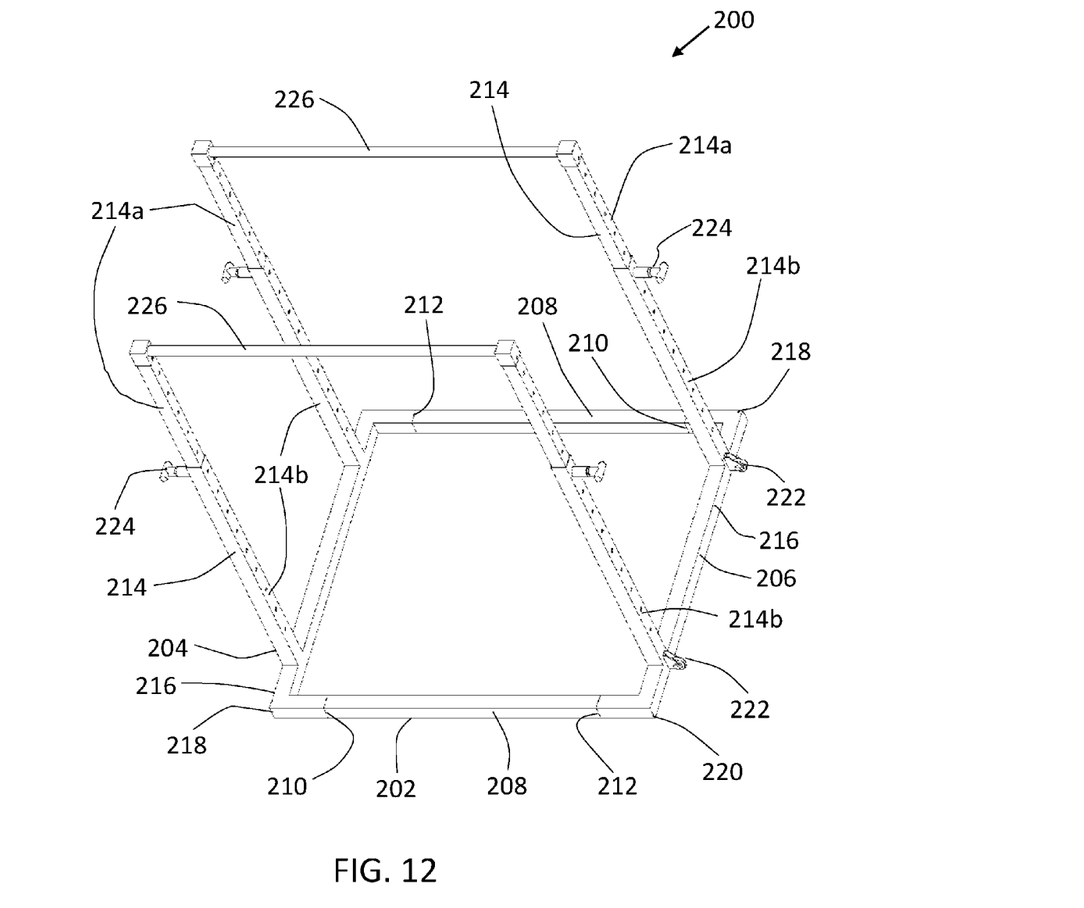
FIG. 12 is a perspective view of a variation of the frame of the exercise apparatus.
Figure 13:
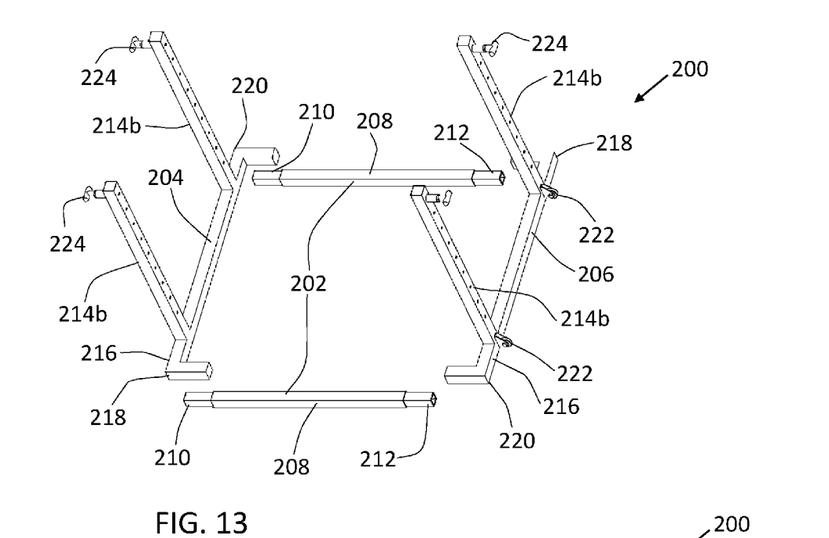
FIG. 13 is a perspective view of the frame of the exercise apparatus shown in FIG. 12 in a disassembled state.

Referring to FIG. 13, apparatus 200 has a base 202, a first vertical support 204 and a second vertical support 206. In the embodiment shown, base 202 has two horizontal supports 208 which are positioned in parallel spaced relation with each other. Each horizontal support 208 has a first end 210 and a second end 212. First vertical support 204 and second vertical support 206 each have two vertical members 214 which are spaced apart from each other. Each of vertical members 214 is connected to a bottom support 216. Bottom supports 216 each have a first end 218 and a second end 220. First end 218 of bottoms supports 216 is attached to first end 210 of horizontal supports 208 and second end 220 of bottom support is attached to second end 212 of horizontal support 208. First vertical support 204 and second vertical support 206 are oriented opposite to each other. As can be seen, base 202, first vertical support 204 and second vertical support 206 are removably attachable. This allows apparatus 200 to be disassembled for moving or when not in use and minimizes the space requirements. In the embodiment shown, a portion of first end 210 and second end 212 of horizontal supports 208 are releasably engaged within bottom supports 216 and are held in position through friction fit. A person of skill will understand that a mechanism for locking horizontal supports 208 within bottom supports 216 may be added to help prevent separation during use. It will also be understood that different methods of releasably engaging horizontal supports 208 to bottom supports 216 may be used. It is preferable that each vertical member 214 be telescopically adjustable to adjust for different heights of people and for different exercises. Vertical members 214 telescope in the same manner as vertical members 22 shown in FIG. 1. Referring to FIG. 12, second portion 214b of vertical member 214 is attached to bottom support 216 and first portion 214a is telescopically adjustable within second portion 214b. Pins 224 are used to lock first portion 214a in position within second portion 214b. In the embodiment shown, removable bar 226 is connected to first portion 214a. Apparatus 200 has at least one anchor 28, shown in FIG. 1, on each vertical members 214 for removably connecting a resistance band 30, shown in FIG. 2.

Unlike apparatus 10 where base 12 and bottom supports 24 are adjustable, base 202 and bottom support 216 of apparatus 200 do not have adjustable lengths. This provides for a more solid structure but may also limit the size of the person able to use apparatus 200. The size of apparatus 200 may be adjusted by using longer or shorter bases 202 and bottom supports 216.

Figure 14:
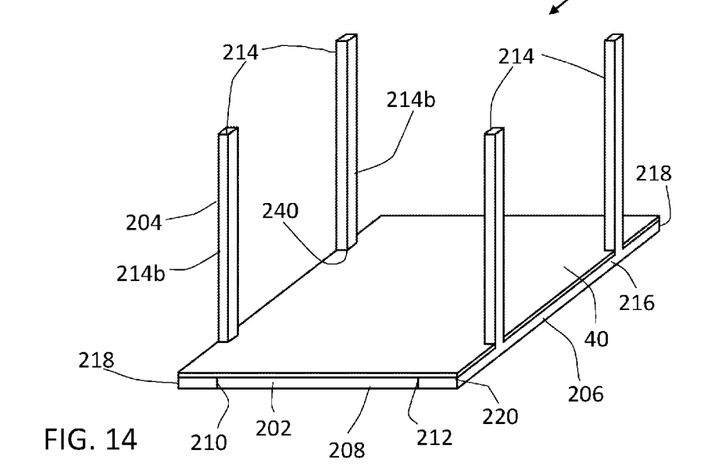
FIG. 14 is a perspective view of the frame of the exercise apparatus shown in FIG. 12 with a removable platform attached.
Figure 15:
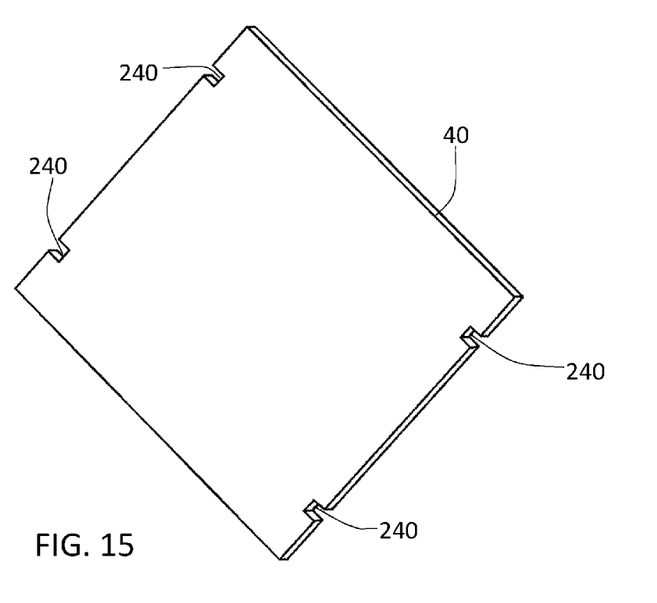
FIG. 15 is a perspective view of the removable platform shown in FIG. 14.

Referring to FIG. 14 and FIG. 15, a standing platform 40 may be removably attached to base 102. In the embodiment shown, standing platform 40 rests on top of horizontal supports 208 of base 202 and bottom supports 216 of first vertical support 204 and second vertical support 206. Notches 240 are provided in standing platform 40 to allow for a secure fit around vertical members 214. Notches 240 help to prevent standing platform 40 from sliding during use of apparatus 200.

While exercise apparatus 200 may be made of any material suitably designed for carrying the weight of individuals using the apparatus 200, it is preferred that exercise apparatus 200 be made of a strong but light weight metal such as steel or aluminum. This provides appropriate strength while maintaining a lightweight exercise apparatus that is not cumbersome for individuals to move. Referring to FIG. 12, although apparatus 200 is preferably made of lightweight materials, it may be beneficial for one of bottom supports 216 to have a set of wheels 222 that touch the ground only when apparatus 200 is tipped on to them. This would allow the set up apparatus to be moved with less effort.

An advantage of exercise apparatus 10 is that it is an all-in-one at home gym that is relatively uncomplicated. There are no pulleys or stacked weights required for use of exercise apparatus 10. In addition, exercise apparatus 10 is light-weight and has no moving parts. Assistance and resistance is provided by resistance bands.

Any use herein of any terms describing an interaction between elements is not meant to limit the interaction to direct interaction between the subject elements, and may also include indirect interaction between the elements such as through secondary or intermediary structure unless specifically stated otherwise.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent that changes may be made to the illustrative embodiments, while falling within the scope of the invention. As such, the scope of the following claims should not be limited by the preferred embodiments set forth in the examples and drawings described above, but should be given the broadest interpretation consistent with the description as a whole.

What is claimed is:

1. An exercise apparatus comprising:
a base having at least one horizontal support, the at least one horizontal support having a first end and a second end;
a first vertical support having two vertical members spaced from each other and connected to a first bottom support, the first bottom support being attached to the first end of the at least one horizontal support of the base;
a second vertical support having two vertical members spaced from each other and connected to a second bottom support, the second bottom support being attached to the second end of the at least one horizontal support of the base such that the first vertical support and the second vertical support are opposite each other;
at least one anchor on each of the vertical members of the first and second vertical supports for removably connecting a resistance band to each of the first and second vertical supports;
a removable assisting seat being held parallel to the base and supported between the first vertical support and the second vertical support by the resistance bands connected to each of the two vertical members of each of the first vertical support and the second vertical support, and the removable assisting seat being movable multidirectionally between the first vertical support and the second vertical support; and a bench being removably attached to the base.

2. The exercise apparatus of claim 1 wherein each of the first vertical support and second vertical support further comprising a removable bar on a top of the vertical members parallel to the first bottom support and the second bottom support.

3. The exercise apparatus of claim 2 wherein the removable bar has a first portion and a second portion, the first portion being movably engaged in the second portion and lockable for telescopically adjusting a length of the removable bar.

4. The exercise apparatus of claim 1 wherein each of the vertical members is equidistant from a center line of the base, and the center line being between the vertical members of each of the first vertical support and the second vertical support.

5. The exercise apparatus of claim 1 wherein each of the vertical members has a first portion and a second portion, the first portion being movably engaged in the second portion and lockable for telescopically adjusting a height of the vertical members and the at least one anchor, and the second portion being connected to one of the first bottom support and the second bottom support.

6. The exercise apparatus of claim 1 wherein each of the first bottom support and the second bottom support has a first portion and a second portion, the first portion being movably engaged in the second portion and lockable for telescopically adjusting a distance between the vertical members.

7. The exercise apparatus of claim 1 wherein each of the first bottom support and the second bottom support has a first portion, a second portion and a third portion, the second portion and the third portion being movably engaged in the first portion and lockable for telescopically adjusting a distance between the vertical members, and the vertical members being connected to the second portion and the third portion.

8. The exercise apparatus of claim 1 wherein the at least one horizontal support of the base comprises two horizontal supports in parallel spaced relation to each other.

9. The exercise apparatus of claim 1 further comprising a standing platform removably connected to the base.

10. An exercise apparatus comprising: a base having two horizontal supports in parallel spaced relation to each other, each of the horizontal support having a first end and a second end;
   a first vertical support having two vertical members spaced from each other and connected to a first bottom support, the first bottom support being attached to the first end of the horizontal supports;
   a second vertical support having two vertical members spaced from each other and connected to a second bottom support, the second bottom support being attached to the second end of the horizontal supports such that the first vertical support and the second vertical support are opposite each other;
   at least one anchor on each of the vertical members of the first and second vertical supports for removably connecting a resistance band, each of the vertical members having a first portion and a second portion, the first portion having the at least one anchor and being movably engaged within the second portion, the second portion being attached to the bottom support, the first portion being lockable within the second portion for telescopically adjusting a height of the vertical members and the at least one anchor;
   and a removable assisting seat being held in parallel to the base and supported between the first vertical support and the second vertical support by the resistance bands connected to each of the vertical members of each of the first vertical support and the second vertical support, and the removable assisting seat being movable multidirectionally between the first vertical support and the second vertical support;
   and a bench being removably attached to the base.

11. The exercise apparatus of claim 10 wherein the vertical supports further comprising a removable bar on a top of the vertical members parallel to the first and second bottom supports.

12. The exercise apparatus of claim 11 wherein the removable bar has a first portion and a second portion, the first portion being movably engaged in the second portion and lockable for telescopically adjusting a length of the removable bar.

13. The exercise apparatus of claim 10 wherein each of the vertical members is equidistant from a center line of the base, the center line being between the vertical members of each of the first vertical support and the second vertical support.

14. The exercise apparatus of claim 10 further comprising a standing platform removably attached to the base.

15. The exercise apparatus of claim 10 wherein each of the first and second bottom supports has a first portion and a second portion, the first portion being movably engaged in the second portion and lockable for telescopically adjusting a distance between the vertical members.

16. The exercise apparatus of claim 10 wherein each of the first and second bottom supports has a first portion, a second portion and a third portion, the second portion and the third portion being movably engaged in the first portion and lockable for telescopically adjusting a distance between the vertical members, the vertical members being connected to the second portion and the third portion.

* * * * *